UNITED STATES PATENT OFFICE.

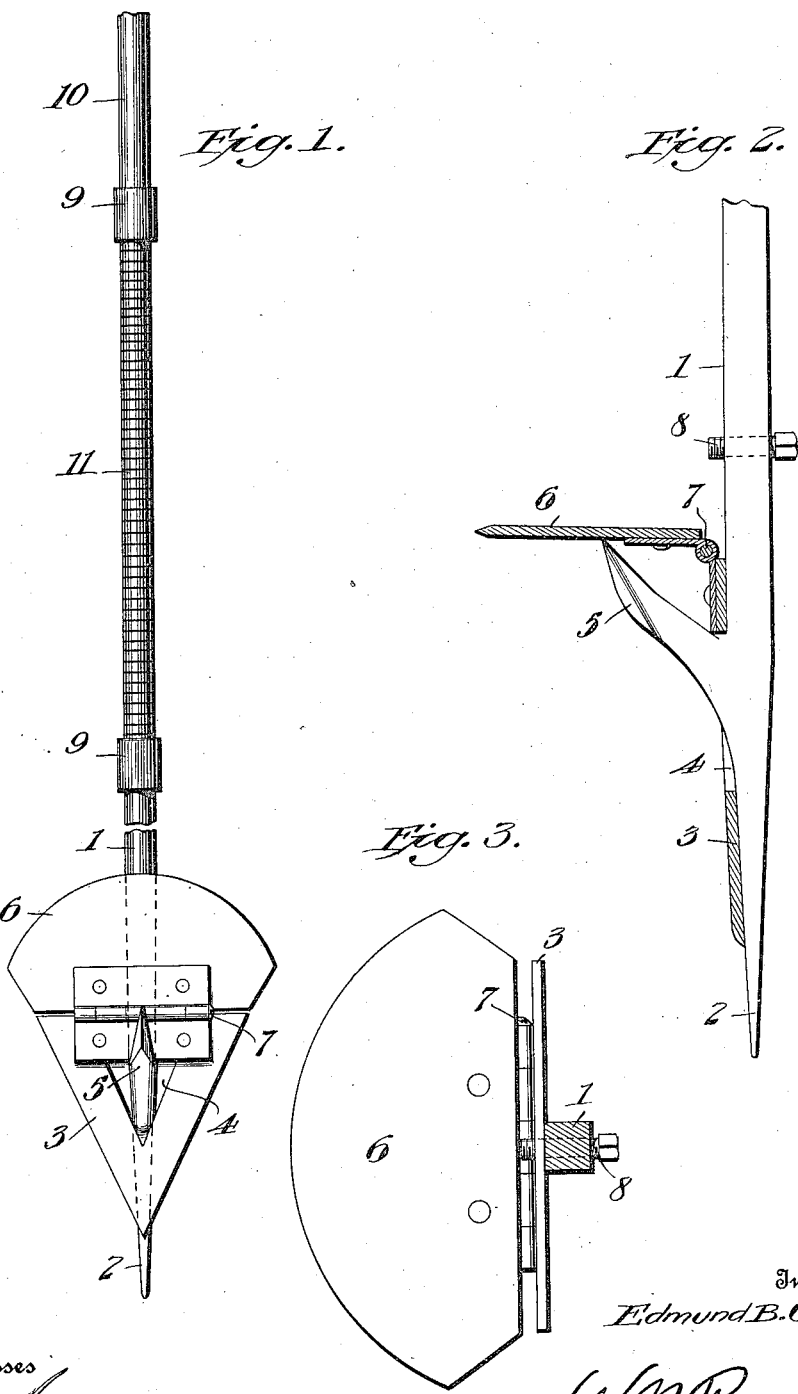

EDMUND B. CULVER, OF GREAT BARRINGTON, MASSACHUSETTS.

SEWER-CLEANING DEVICE.

1,081,488.  Specification of Letters Patent.  Patented Dec. 16, 1913.

Application filed June 10, 1913. Serial No. 772,858.

*To all whom it may concern:*

Be it known that I, EDMUND B. CULVER, a citizen of the United States of America, residing at Great Barrington, in the county of Berkshire and State of Massachusetts, have invented certain new and useful Improvements in Sewer-Cleaning Devices, of which the following is a specification.

My invention relates to that class of pipe and sewer-cleaning hoes in which a handle of coupled sections is used with a hoe of hinged sections, inserted into the pipe or sewer to draw the accumulation of foreign matter therein to the man hole, or opening, for removal.

The objects of my invention are, to provide a hoe with a sectional and, where necessary, flexible handle; to provide a hoe which will cut its way through the accumulated matter when entering the pipe and will interpose a surface to withdraw said matter when the implement is withdrawn; to provide a hoe in which the hinged or hoe member may be set at any desired angle when entering the pipe, and to provide a hoe in which the hinged or hoe member may be speedily removed to allow a rake or hook to be brought into play for the removal of rags or the like, which may be pushed ahead of the hoe when entering the pipe and consequently not caught by the same when being withdrawn.

With these and such other objects in view as may hereinafter more fully appear, the invention consists in the novel construction and arrangement of parts set forth in the specification and claimed in the claims, and which are shown in the accompanying drawings, wherein:—

Figure 1 is a plan view of the device, the hinged or hoe portion being shown in the position it assumes when being thrust into a pipe. Fig. 2 is a side elevation of the hoe section, the hoe and triangular cutting member being shown in section and the hoe being shown in operative position. Fig. 3 is an end elevation, the hoe being shown in operative position.

Referring to said drawings by numerals, a handle section 1 terminating in a point 2, has mounted thereon, in any suitable manner, either by casting therewith or welding or otherwise fastening thereto, the triangular cutting member or blade 3, provided with a slot or opening 4 through which passes the rake or prong 5, carried by the handle 1 and preferably integral therewith. Said rake or prong 5 acts as a stop or bumper for the hoe member and also serves to catch rags or the like and draw them from the pipe or sewer.

Hinged to the triangular portion 3, at the side thereof which lies upon the handle 1, is the hoe member 6. The hinge pin 7, which connects said hoe member to said triangular portion being, by preference, a loose pin to permit the hoe member to be easily and rapidly removed when desired. Handle 1 is provided with a threaded recess for the reception of screw 8, by means of which the angle or position of said hoe member 6 may be varied as desired. The handle for said implement is sectional, the sections being joined together in any suitable manner but preferably, as here shown, by means of the threaded sleeves or collar 9 which engage the threaded ends of the sections. Said sections may be solid as shown at 10 or the handle may consist wholly or in part of flexible sections, such as shown at 11, when the same is rendered desirable by reason of curves or bends in the pipe.

The device is operated in the following manner: When a pipe is to be cleaned, the implement is inserted therein, point first, sections being added to the handle until the desired length is attained. During the insertion of the implement hoe member 6 will rest upon the screw 8, the point 2 and edges of members 3 and 6 serving to cut a way through the accumulated foreign matter which it is desired to remove. Upon starting to withdraw the implement, member 6 will be thrown up against rake or prong 5 and will carry with it the aforesaid foreign matter. Rake or prong 5 serves to catch rags and the like for the purpose of withdrawing the same from the pipe. In order to facilitate the operation of said rake or prong, loose pin 7 may be easily removed thus releasing hoe section 6.

Having described my invention, what I claim as new and desire to secure by Letters Patent, is:—

1. A sewer-cleaning implement consisting of a handle section, a triangular cutting member mounted thereon, a prong mounted on said handle member and passing through a suitable opening in said cutting member, and a hoe member detachably hinged to said cutting member and adapted to rest against said prong when in operative position.

2. A sewer-cleaning hoe comprising a handle section, a cutting member mounted thereon said cutting member being provided with a recess, a prong carried by said handle section and passing through said recess, a hoe member hinged to said cutting member and resting against the point of said prong when in operative position, and means carried by said handle section for adjustably limiting the movement of said hoe member between said prong point and said handle section.

In testimony whereof I hereunto affix my signature in presence of two witnesses.

EDMUND B. CULVER.

Witnesses:
 JOHN L. E. PELL,
 H. TAYLOR DAY.

Copies of this patent may be obtained for five cents each, by addressing the "Commissioner of Patents, Washington, D. C."